United States Patent Office 3,730,764
Patented May 1, 1973

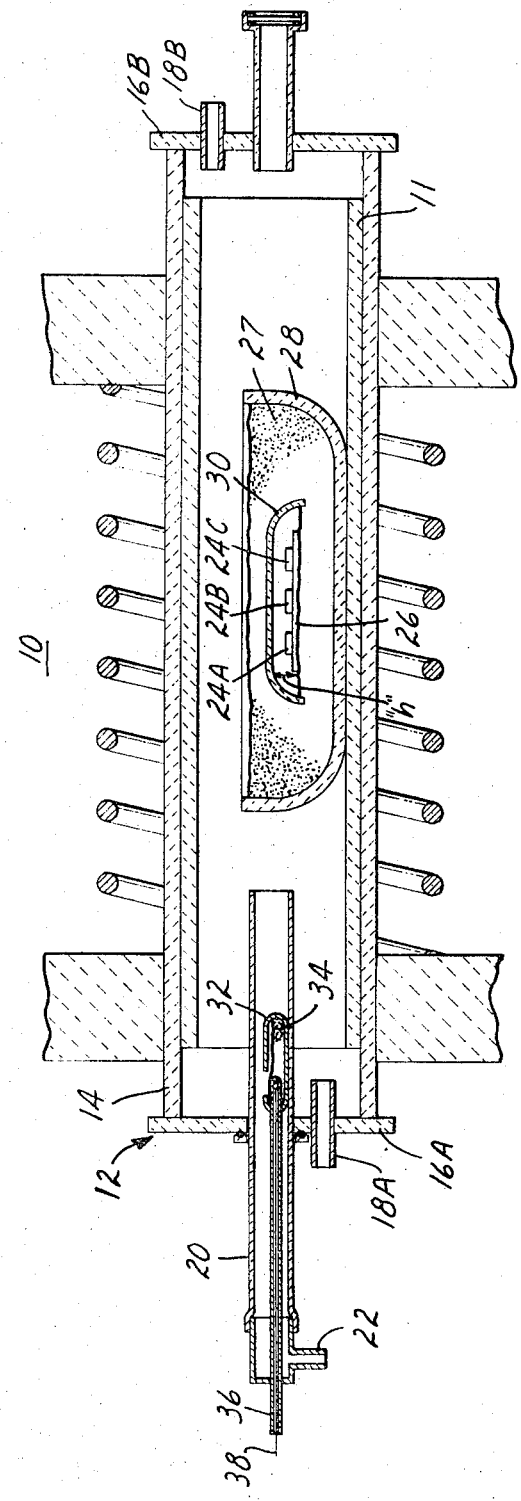

3,730,764
PROCESS FOR PRODUCING A PARALLEL OVERGROWTH FOR USE AS AN EPITAXIAL THIN FILM LASER
Gunther H. Dierssen, White Bear Lake, Minn., assignor to Minnesota Mining and Manufacturing Company, St. Paul, Minn.
Filed Dec. 23, 1969, Ser. No. 887,650
Int. Cl. H01l 7/32
U.S. Cl. 117—201                                  9 Claims

ABSTRACT OF THE DISCLOSURE

A static atmosphere process for production of laminar laser materials. An epitaxial film or parallel overgrowth of a source material is produced on a single-crystalline substrate. The source material and substrate are each a compound or solid solution of the elements cadmium, sulfur, zinc, selenium and tellurium. The substrate is selected to have an optical band edge at least equal to the source material optical band edge and to have an interatomic spacing within 12% of the interatomic spacing of a crystal of the source material. The substrate is provided with at least one growth surface which is substantially flat and has a crystallographic orientation corresponding to the crystallographic orientation of a naturally occurring major face of a crystal of the source material. The substrate growth surface is positioned proximate a bed of porous source material in a static atmosphere reaction chamber and the source material and substrate material are heated to a uniform predetermined temperature to promote sublimation of the source material to produce a parallel overgrowth of the source material on the substrate growth surface.

BACKGROUND OF THE INVENTION

Since at least the mid-1960's, attempts have been made to construct two-dimensionally "scannable" laser devices. In a scannable laser device, a source of excitation energy, most commonly an electron beam having a relatively small cross-sectional area, is impinged upon and penetrates a first surface of a laser material. This first surface together with an opposite second surface form a resonant cavity and when laser emission is produced, it exits or is emitted from the second surface at a point opposite the point at which the electron beam impinged. By scanning the beam of excitation energy across the first surface, the resulting emission from the second surface is scanned in a corresponding manner.

The earliest reported scannable lasers employed materials which were either "wafers" or "platelets." Wafers are slices of material cut from bulk crystals. The surfaces formed by cutting (the "cut" surfaces) are ground and polished to an appropriate smoothness and parallelity to form the aforementioned first and second cavity surfaces. A platelet is a crystal which grows as a thin slice of material having natural surfaces which in some instances are sufficiently smooth and plano-parallel to form cavity surfaces. Usually, each smooth and plano surface of a platelet is not a continuous plane surface; rather, it comprises a series of step or plateau-like surfaces individual ones of which are a smooth, continuously plane surface. Properly selected platelets for use in such lasers thus do not require polishing and grinding as does a wafer; however, wafers are generally larger than platelets.

The useable emission from a particular laser material is generally composed of a single or relatively few wavelengths. For semi-conductor laser materials the emission is generally referred to as band edge emission which means that a major proportion of the light is emitted in a narrow band just below the optical band edge of the material. The elemental composition of a material determines the wavelength of its "band." The bands of the different compositions of the series of compounds and solid solutions of the elements of the present invention collectively extend over an entire range of wavelengths. The extremes of the range are the bands of zinc sulfide and cadmium telluride. Each multi-composition material (ternary or more complex compositions), and each other binary compound of the series has a band lying between these extremes. The series is generally defined as: $Zn_xCd_{1-x}S_ySe_zTe_{1-y-z}$, wherein each of $x$ and $(y+z)$ may have values between 0 and 1.

The present invention provides a way to utilize certain of the more desirable properties of both platelets and wafers while providing advantages which neither of them possess. According to the present invention, a parallel overgrowth laser material can be produced having the large surface area of a wafer but lacking the wafer's aforementioned limitations. The present invention also permits utilization of the relatively easily attainable plano-parallel quality of platelets. In addition, the present invention provides a practical method of producing parallel overgrowth laser materials which will lase at a particular preferred wavelength. According to the process of my invention, it is possible to repeatedly reproduce multi-composition parallel overgrowths.

SUMMARY OF THE INVENTION

The present invention provides a process for producing a parallel overgrowth having an exposed surface suitable for use as one reflective surface of a laser cavity. Both a source material from which, and a substrate material upon which, the overgrowth is grown are selected from the group consisting of compounds and solid solutions of the elements cadmium, sulfur, zinc, selenium and tellurium.

The substrate is selected to have an interatomic spacing within 12% of the interatomic spacing of the source material, i.e., the substrate and source interatomic spacing mismatch is to be less than 12%. The substrate is provided with, i.e., it is prepared or selected to have, at least one substantially flat "growth" surface which has a crystallographic orientation of a naturally occurring major face of a crystal of the source material. The substrate material is also characterized by an optical band edge at least equal to the source material optical band edge. This growth process is carried out by providing a static reaction chamber within a vacuum tight enclosure wherein the direct flow of vapors between the enclosure and the reaction chamber is prevented and wherein the diffusion of vapors between the enclosure and the reaction chamber is allowed, thereby equilibrating the atmospheres in the enclosure and chamber. A porous bed of a predetermined quantity of sinter powder of source material and a substrate are positioned in the reaction chamber proximate one another. The source material and substrate are heated to a uniform predetermined temperature to promote sublimation of the source material without substantially affecting the porous nature thereof. The process is continued sufficiently long to provide a desired thickness of parallel overgrowth, e.g., epitaxial thin-films, of source material on the substantially flat growth surface of the substrate. Preferably, to provide a growth rate between practical and acceptable limits, the temperature of the source material is maintained at a temperature corresponding to a vapor pressure of at least one of the source material elements within a range from 0.1 to 10.0 torr.

By parallel overgrowth is meant an epitaxially grown layer having an exposed surface which is both substantially flat and plano-parallel with respect to the substrate surface on which the layer is grown. By substantially flat is meant a surface which produces fewer than twenty and preferably fewer than ten fringes per millimeter when compared against an optical flat using interferrometric techniques and green light. By substantially plano-parallel is meant surfaces which produce fewer than a predetermined number of fringes per millimeter when viewed using interferrometric techniques. The predetermined number of fringes is a function of the wavelength of the light employed; it would be less than twenty, and preferably less than ten, when green light is employed. These definitions of flatness and parallelity apply to both overgrowth and substrate surfaces. The qualitative test of a substantially flat substrate surface is that the lattice of the desired crystallographic orientation be exposed nearly everywhere on the surface so that a continuous parallel overgrowth will be produced.

The substrate may be either a platlet or a wafer. A substrate wafer is prepared from a larger bulk single crystal by the following general procedures: mounting the crystal on a cutting support by use of a thermoplastic adhesive such as bees-wax; orienting, such as by conventional X-ray diffraction or optical backscattering methods, the crystal to have the plane containing the lattice of the desired crystallographic orientation parallel to the cutting path; cutting the crystal into wafers of an appropriate thickness; and, grinding and polishing the cut surfaces to the desired plano-parallelity using conventional surface grinding technology. Preferably the polished surface upon which the film is to be grown is exposed to a very gentle surface etch, using an etchant such as either a dilute acid or a vapor etchant. One such vapor etchant is gaseous hydrogen. The vapor etch is preferably performed immediate before beginning the growth process, although this step can also be performed during the first few minutes of the vapor growth process.

Table I below sets forth source and substrate combinations of binary compounds satisfying the aforedescribed interatomic spacing mismatch and optical band edge requirements.

TABLE I

| Source | Substrate(s) | Mismatch, percent |
|---|---|---|
| ZnS | ZnS | 0.0 |
| CdS | ZnS | −7.2 |
|  | CdS | 0 |
|  | ZnSe | −2.8 |
| ZnSe | ZnS | −4.5 |
|  | ZnSe | 0 |
| CdSe | ZnS | −10.7 |
|  | CdS | −3.8 |
|  | ZnSe | −6.5 |
|  | CdSe | 0 |
|  | ZnTe | +.8 |
| ZnTe | ZnS | −11.4 |
|  | CdS | −4.5 |
|  | ZnSe | −7.2 |
|  | ZnTe | 0 |
| CdTe | CdS | −10.0 |
|  | CdSe | −6.4 |
|  | ZnTe | −5.7 |
|  | CdTe | 0 |

Mismatch was calculated for Table I using the formula:

$$\text{Mismatch} = \frac{(L_1 - L_2) \times 100}{L_2} \%$$

wherein: $L_1$ and $L_2$ are the interatomic spacings of the substrate and source materials respectively.

The interatomic spacing and optical band edges of the compounds of Table I are set forth below in Table II.

TABLE II

|  | ZnS | CdS | ZnSe | CdSe | ZnTe | CdTe |
|---|---|---|---|---|---|---|
| Interatomic spacing (A.) | 2.34 | 2.52 | 2.45 | 2.62 | 2.64 | 2.80 |
| Band edge (e.v.) | 3.65 | 2.415 | 2.71 | 1.74 | 2.32 | 1.54 |

By naturally occuring major face, is meant a face produced in preference to, although not to the exclusion of, other faces when high purity, undoped source materials are employed under growth conditions approximating those of nature, i.e., slow, near equilibrium growth conditions. Examples of naturally occurring major faces of hexagonal type materials such as CdS, CdSe, solid solutions thereof and ZnS, formed through static atmosphere crystal growth experiments and as determined by X-ray crystallographic investigation, are the basal planes (0001) and (000$\bar{1}$); the first order prismatic planes ($1\bar{1}00$) ($01\bar{1}0$) ($10\bar{1}0$) ($\bar{1}010$) ($\bar{1}100$) ($0\bar{1}10$); and the second order prismatic planes ($\bar{1}2\bar{1}0$) ($\bar{1}120$) ($2\bar{1}\bar{1}0$) ($1\bar{2}10$) ($11\bar{2}0$) ($\bar{2}110$). By a like manner of determinations, octahedral planes (111) (11$\bar{1}$) ($\bar{1}11$) ($\bar{1}\bar{1}1$) (1$\bar{1}$1) ($\bar{1}1\bar{1}$) ($\bar{1}1\bar{1}$) and (1$\bar{1}\bar{1}$) are known to have been found to be naturally occurring faces for cubic compounds such as ZnSe, ZnTe, and CdTe. The crystallographic orientations of the octahedral planes of a cubic crystal correspond to the crystallographic orientations of the basal planes of a hexagonal crystal, E.g., the (111) planes of a cubic crystal structurally correspond to the basal (0001) planes of a hexagonal crystal.

BRIEF DESCRIPTION OF THE DRAWING

The drawing shows a growth system suitable for carrying out the growth steps of the present process.

Referring now to the drawing, a sectional view of a furnace 10 and a vacuum tight enclosure 12 which passes therethrough is shown. The vacuum tight enclosure 12 comprises a fused-silica tube 11 within a mullite tube 14 having removable end seals 16A and 16B having ports 18A and 18B respectively. End seal 16A has an additional opening through which a fused silica tube 20 may be inserted. The tube 20 also has a port 22.

According to one process of the present invention, ports 18A, 18B and 22 are sealed and the sealed tube 14 then forms a static reaction chamber. The source material and substrate are placed within tube 14 and the ambient temperature within the tube raised to the desired reaction temperature.

In another process, the static reaction chamber is formed by inverting a container over the substrate. This is shown in the drawing, wherein crystal substrates 24A, B and C rest on an inert spacer 26 which in turn rests on a porous bed of sinter powder source material 27 in a fused silica boat 28. A container 30 is inverted over the substrates and spacers with at least the rim of the container below the surface of the sinter powder. Although it need not be, the container 30 may be completely submerged in the sinter powder. A space having a vertical dimension, indicated in the drawing by the character $h$, of from about ¼ inch (.5 cm.) to about 2 inches (5 cm.) and preferably of about 1 inch (3 cm.) provides the reaction chamber. Preferably the exposed surface area of the porous bed is approximately equal to the total surface area of the substrate growth surfaces. Container 30 may be impervious or slightly porous. Port 22 is sealed. Either port 18A or 18B is connected to a source of an inert gas, e.g., argon; the other port serves as an outlet port. Before any substantial heating of the source material, a slow flow of the inert gas (from 10 to 100 cubic centimeters per minute) is maintained through the tube for a time sufficient for the gas to filter, i.e. diffuse, through the porous bed of source material and enter and fill the static reaction chamber.

In a further process of the present invention, a vapor of one constituent (an element) of the source material is introduced into a vacuum tight enclosure at a temperature corresponding to a vapor pressure of the constituent of from 0.1 to 10 torr. Vapors of the constituent disperse throughout the enclosure and enter and diffuse into the static rection chamber to control the stoichiometry of the parallel overgrowth. In the drawing, a boat 32 is shown to contain a constituent 34. A push rod 36 is provided for moving boat 32 into and out of the furnace for positioning the boat 32. During the growth process the boat 32 is positioned in a region of the furnace at a temperature corresponding to a vapor pressure of the constituent of from 0.1 to 10 torr. Vapors of the constituent disperse throughout the enclosure and enter and diffuse into the reaction chamber through passageways normally existing in the porous bed to control the stoichiometry of the parallel overgrowth. A thermocouple 38 is provided for monitoring the temperature of the constituent element. The source of inert gas previously referred to would be connected to port 22 and port 18A would be sealed.

In each of the foregoing processes, a slow flow of an inert gas may be passed through the vacuum tight enclosure at about atmospheric pressure during the growth process. Even in those cases where the vacuum tight enclosure is not itself the static reaction chamber, the passageways in the bed of porous source material result in the reaction chamber being maintained at about atmospehric pressure. Each of the foregoing processes may also include a surface etch as previously described if the substrate employed is a wafer.

It is to be understood that all materials and apparatus used in carrying out the present invention, except the source, substrate and constituent materials, are chemically inert, i.e., they do not enter into the reaction which produces the parallel overgrowth. Having thus described the general features of my invention, specific examples will now be discussed.

EXAMPLE 1

From a batch of cadmium sulfide platelet crystals, crystals were examined using an interference microscope which employed green monochromatic light of approximately 5460 angstroms. Platelets which had less than twenty fringes per millimeter over a substantial portion of their major surfaces were selected for use as substrates.

The platelets were placed on a CdS crystal spacer which rested upon a bed of sintered powder particles having an average diameter of less than one micron and having a composition of $CdS_{0.8}Se_{0.2}$. The substrate growth surface was substantially horizontal. A container in the form of a fused silica boat was placed in inverted position over the platelets and crystal spacers to provide a static reaction chamber above and around the platelets exposed surfaces. Additional sinter powder of the source material was then added to seal the static reaction chamber except for passageways normally existing through the sinter powder. The dimension $h$ was about one inch.

The growth was carried out in a vacuum tight enclosure adapted for argon flow therethrough such as that shown in the drawing. Tube 11 was a 2¼ inch (5.72 cm.) outside diameter circular fused silica tube about 56 inches (140 cm.) long, and tube 14 was a 2½ inch (6.35 cm.) inside diameter circular mullite tube about 60 inches (150 cm.) long. Boat 28 was a half section of a circular fused silica tube with the ends turned up. Container 30 was a similarly formed fused silica tube. The ends of the tube at which the argon entered and exited were near room temperature. The boat containing the platelets was placed in the "exit" end of the mullite tube system (the end from which the argon exited) and held in a slow argon flow (about 50 cc. per minute) for approximately 10 minutes to provide an opportunity for the argon to filter through the sintered powder particles and enter and fill the cavity formed by the inverted boat. The boat was then pushed into a zone of the system at which the temperature would be uniform across the reaction chamber. The temperature of that zone was maintained at about 1050° C. for about 20 minutes and then the temperature of the zone was rapidly reduced (over about 1–2 minutes) to about 990° C. Then, the zone temperature was again reduced to about 900° C., this time relatively slowly (over a period of about 90 minutes). The boat was then pulled into the exit end of the system for approximately 20 minutes to cool the crystals.

Upon inspection of the platelets after removal from the boat, an orange-colored growth of uniform thickness was observed to cover what had been the top growth surface of the platelet. Microscopic examination of a cleaved cross-section of this growth-substrate combination showed a uniform, approximately 30 microns thick, parallel overgrowth.

One platelet was cleaved normal to the growth surface into several portions. One portion was next provided with mirrors. A dielectric mirror was deposited by vapor deposition on a glass slide and was secured to the natural platelet surface (the "bottom" surface) using a thermosetting adhesive varnish (GE 7031 Varnish). The exposed surface of the cadmium sulfide selenide parallel overgrowth was coated by well-known evaporation techniques with a layer of silver about 0.15 micron thick. This structure was next mounted in thermal contact with a copper cold finger of a cryostat filled with liquid nitrogen in a manner to permit bombarding of the silvered surface of the parallel overgrowth with an electron beam. When the silvered surface of the overgrowth was bombarded, light was emitted through the dielectric mirror, was collected, and was analyzed external to the cryostat using a conventional monochrometer grating and plotting device. The bombarding beam was a pulsed electron beam having a current density which was varied from zero to about 10 amps/cm.$^2$ and an energy of 45 kev. At a current density approaching 10 amps/cm.$^2$, an oscilloscope trace of the intenity of the emitted light versus current density became superlinear and the emission was visually observed to become directional. At a current density of 10 amps/cm.$^2$ the power or intensity of the emission was measured using conventional photometric methods and found to be 500 milliwatts. A plot of the emission spectrum at 77° K. and a current density of 10 amps/cm.$^2$ was characterized by five major "modes" or "peaks" at wavelengths of about 5409, 5424, 5444, 5465 and 5486 angstroms. When the temperature of the assembly was raised to room temperature, for the same range of current densities, the emission continued to be directional but its peak intensity (at 10 amps/cm.$^2$) dropped to 150 milliwatts.

EXAMPLE 2

Another group of five cadmium sulfide platelets were selected as described in Example 1. The platelets were placed on a MgO spacer on a bed of sintered powder particles of $CdS_{0.8}Se_{0.2}$ such as those described in Example 1. A static reaction chamber was formed and the cavity thereof filled with argon gas as described in Example 1. Films were then grown on the platelets according to the following process.

The boat containing the sintered powder particles was positioned in a zone of the tube system at which the temperature was 950° C. This temperature was maintained for about 18 hours during which time a slow flow of argon (about 100 cubic centimeters per minute) was maintained through the enclosure 12. The cooling step of Example 1 was followed after which a microscopic examination of a cleaved cross-section of a substrate was made. The examination revealed both an orange-colored growth of a uniform thickness of about 10 microns on the "top" surface of the substrate and areas of growth, each area being of uniform thickness, but different areas varying from 2 to 5 microns in thickness on the "bottom" substrate surface.

The top and bottom surfaces of a growth-substrate combination were provided with silver mirrors and then mounted, cooled, and the silvered growth surface bombarded as described in Example 1. At a bombarding beam current density of about 4.5 amps/cm.$^2$, a substantial increase in the directionality of the emission from the crystal was observed, and the plot of wavelength versus intensity of the emission exhibited modes at 5408, 5422, 5438, 5447, 5468, and 5474 angstroms, with the 5447 mode having the greatest intensity. The intensity of the emission increased superlinearly with respect to current density for increases in current density above about 4.5 amps/cm.$^2$. The maximum power output at 77° K. was 3.0 watts. At room temperature, using the same range of current densities, the emission continued to exhibit the properties of superlinearity and directionality but its peak intensity dropped to 0.7 watt at about 10 amps/cm.²

EXAMPLE 3

Substrates were selected from a batch of cadmium sulfide platelets as described in Example 1. A bed of source material and a static reaction chamber was provided like that described in Example 1.

The growth was carried out by placing the boat containing the platelets in the exit end of the enclosure 12 and held there in a slow argon flow (about 100 cubic centimeters per minute) for approximately 30 minutes. The boat was then pushed into a zone of the system at which the temperature would be uniform across the reaction chamber. The temperature of that zone was maintained at about 980° C. for 20 minutes. About 15 minutes into that period, a small fused silica boat containing about 10 grams of selenium metal which had previously been positioned in the "entrance" end of enclosure 12 (the end from which the argon entered) was moved towards the center of the furnace to a region at which the temperature of the selenium metal was at approximately 430° C. For the remainder of the growth process, movement of the selenium boat was made as required to maintain the boat temperature at about 430° C.

After the substrates had been exposed to a temperature of 980° C. for the aforementioned 20 minute period, the temperature of the furnace was dropped very rapidly (over a period of about 10 minutes) to 910° C. thereafter, a 50° C. per hour temperature drop was continued for about 2 hours. When the temperature had reached about 830° C., the selenium boat was withdrawn to the entrance end of enclosure 12 into a region at about room temperature. About 15 minutes later, at approximately the end of the 2 hour period, when the temperature of the furnace in the region of boat 28 had dropped to 810° C., the boat 28 was pulled into the exit end of enclosure 12 into a region also at about room temperature. The boat 28 was left to cool in the region for about 20 minutes after which it was removed from enclosure 12.

Inspection of the platelets after removal from the boat revealed they had curled slightly, resulting in a dark, red-colored growth on both the top and bottom substrate surface. Microscopic examination of a cleaved cross-section of a large growth-platelet combination, part of which was used in a subsequent laser evaluation, indicated that the platelet was 25 microns thick and had a uniform growth of cadmium selenide about 4 microns thick on the top surface and a uniform growth about ½ a micron thick on the bottom surface. Some striations were observed on the growth along the C direction.

A cleaved section of the afore-described growth-platelet combination was coated on its top and bottom surfaces by vacuum evaporation techniques with silver mirrors about 1550 angstroms thick on the top side and about 525 angstroms thick (semi-transparent to the emission of the parallel overgrowth) on the bottom side. The semi-transparent mirrored surafce was attached with a thin layer of a thermosetting varnish to a sapphire cryostat window slab which was in turn mounted in thermal contact with a cold finger of a cryostat filled with liquid nitrogen. When the sample was bombarded on the surface coated to a thickness of 1550 angstroms with an electron beam as described in Example 1, an oscilloscope trace of the emission intensity versus current density of the bombarding beam became superlinear at a current density of about 8.0 amps/cm.². For a bombarding beam current density of about 10 amps per square centimeter, the intensity of the emission was measured using conventional photometric methods to be about 5 milliwatts and a plot of the emission spectrum showed mode oscillations indicative of laser emission; the 3 major modes of emission intensity occured at wavelengths of about 6858 angstroms, 6872 angstroms and 6905 angstroms.

What is claimed is:

1. A vapor deposition process for the production of an epitaxial thin-film on a single crystalline substrate, wherein the resultant thin-film-substrate combination, when formed into a resonant cavity, is capable of laser emission, said process comprising the steps of:
   (a) selecting a combination of a single crystalline substrate material and source material wherein both said materials are compounds or solid solutions of at least one of the elements selected from the group consisting of cadmium and zinc, together with at least one of the elements selected from the group consisting of sulfur, selenium and tellurium, wherein crystals of both said materials have an interatomic spacing mismatch along at least one crystallographic axis of less than 12 percent, wherein said single crystalline substrate has at least one substantially flat growth surface crystallographically oriented to correspond with a naturally occurring major face of a crystal of said source material and wherein said substrate has an optical band edge at least equal to the source material optical band edge;
   (b) providing a vacuum tight enclosure as a static reaction chamber;
   (c) positioning within said reaction chamber a porous bed of a predetermined quantity of sinter powder of said source material;
   (d) positioning said substrate on an inert spacer block on said porous bed; and
   (e) heating said reaction chamber to a uniform predetermined temperature sufficient to enable sublimation of said source material, and continuing heating to produce said epitaxial thin-film of said source material on said substantially flat growth surface.

2. A process according to claim 1, wherein said selecting step comprises selecting as a substrate a material having major surfaces parallel to within ten fringes per millimeter when viewed with an interference microscope using green light.

3. A process according to claim 1, further comprising introducing into said vacuum tight enclosure a constituent element of said source material and heating said element to a temperature corresponding to a vapor pressure of said element of from 0.1 to 10 torr, whereby vapors of said element disperse throughout said enclosure and diffuse into said reaction chamber to control the stoichiometry of said epitaxial thin-film.

4. A vapor deposition process for the production of an epitaxial thin-film on a single crystalline substrate, wherein the resultant thin-film-substrate combination, when formed into a resonant cavity, is capable of laser emission, said process comprising the steps of:
   (a) selecting a combination of a single crystalline substrate material and source material wherein both said materials are compounds or solid solutions of at least one of the elements selected from the group consisting of cadmium and zinc, together with at least one of the elements selected from the group consisting of sulfur, selenium and tellurium, wherein crystals of both said materials have an interatomic spacing mismatch along at least one crystallographic axis of less than 12 percent, wherein said single crystalline substrate has at least one substantially flat growth surface crystallographically oriented to correspond with a naturally occurring major face of a crystal of said source material and wherein said substrate has an optical band edge at least equal to the source material optical band edge;
   (b) providing within a vacuum tight enclosure a porous bed of a predetermined quantity of sinter powders of said source material;
   (c) positioning an inert spacer block on said porous bed;

(d) positioning said substrate material on said inert spacer;
(e) covering said positioned substrate material with an inverted container to form a static reaction chamber between said inverted container and said substrate material, wherein the walls of said inverted container extend into said porous bed to prevent direct flow of vapors between said enclosure and said chamber and to allow vapors to pass between said enclosure and said chamber by diffusing through said porous bed; and
(f) heating said reaction chamber to a uniform predetermined temperature sufficient to enable sublimation of said source material, and continuing heating to produce said epitaxial thin-film of said source material on said substantially flat growth surface.

5. A process according to claim 4, wherein said inverted container comprises a non-porous material and wherein said step of positioning said inverted container further comprises adding additional source material such that said inverted container is completely covered by sinter powders of said source material, thereby further restricting said diffusion path of vapors between said reaction chamber and said enclosure.

6. A process according to claim 5 further comprising the step of flowing an inert gas through said enclosure at a rate of less than 100 cubic centimeters per minute, wherein said inert gas diffuses through said porous bed into said reaction chamber, thereby displacing gasses initially present and thereafter providing an inert atmosphere within said chamber at about atmospheric pressure wherein vapors of said source material are transported and deposited as a said single crystalline epitaxial film of said source material on said substantially flat growth surface.

7. A process according to claim 1
wherein the selecting step comprises selecting as a substrate material, a single crystalline platelet of cadmium sulfide, and selecting as a source material, a sinter powder having an average diameter of less than one micrometer and having a composition of $CdS_{0.8}Se_{0.2}$; and
wherein said heating step comprises positioning said reaction chamber in a zone at which the temperature is uniform across said reaction chamber and maintaining said zone temperature at about 1050° C. for about 20 minutes, rapidly reducing the zone temperature to about 990° C. in less than 2 minutes and thereafter slowly reducing the temperature over a period of about 90 minutes to about 900° C., thereafter moving said bed into a cool portion of the enclosure adjacent a port allowing gasses to exit the enclosure, and allowing said bed to cool for approximately 20 minutes before removal from the enclosure.

8. A process according to claim 6
wherein the selecting step comprises selecting as a substrate material, a single crystalline platelet of cadmium sulfide, and selecting as a source material, a sinter powder having an average diameter of less than one micrometer and having a composition of $CdS_{0.8}Se_{0.2}$, and wherein the heating step comprises positioning said reaction chamber in a zone at which the temperature is uniform across said reaction chamber and maintaining said zone temperature at 950° C. for about 18 hours, thereafter moving said bed into a cool portion of the enclosure adjacent a port allowing gasses to exit the enclosure and allowing said bed to cool for approximately 20 minutes before removal from the enclosure.

9. A process according to claim 6 further comprising positioning within said enclosure a source of selenium;
wherein the selecting step comprises selecting as a substrate material, a single crystalline platelet of cadmium sulfide, and selecting as a source material, a sinter powder having an average diameter of less than one micrometer and having a composition of $CdS_{0.8}Se_{0.2}$; and
wherein the heating step comprises positioning said reaction chamber in a zone at which the temperature is uniform across said reaction chamber and maintaining the temperature of the zone at about 980° C. for 20 minutes, moving the selenium metal source into a region wherein the temperature is approximately 430° C. after said bed has been held at 980° C. for about 15 minutes and maintaining the selenium source at about 430° C. for the remainder of the growth process, after said 20 minute period reducing said zone temperature to 910° C. over a period of about 10 minutes, thereafter reducing said zone temperature at 50° C. per hour for about 2 hours, meanwhile removing the selenium metal source into a region of said enclosure at about room temperature when said zone temperature reaches about 830° C., and after said bed cools to 810° C., moving said bed into a cool portion of said enclosure adjacent a port allowing gasses to exit the enclosure and allowing said bed to cool for approximately 20 minutes before removal from the enclosure.

References Cited

UNITED STATES PATENTS

| | | | |
|---|---|---|---|
| 3,148,094 | 9/1964 | Kendall | 148—175 |
| 3,493,444 | 2/1970 | Sirtl | 117—106 A |
| 3,290,181 | 12/1966 | Sirtl | 148—1.6 |
| 3,461,004 | 8/1969 | Lochner et al. | 148—175 |
| 3,471,324 | 10/1969 | Wilson et al. | 117—106 A |
| 3,489,621 | 1/1970 | Sirtl | 117—106 A |
| 3,472,685 | 10/1969 | Marfaing et al. | 117—201 |

FOREIGN PATENTS

| | | |
|---|---|---|
| 1,099,098 | 1/1968 | Great Britain. |

OTHER REFERENCES

"Epitaxial Films of PbTe, PbSe, and PbS Grown on Mica Substrate," Bul. J. Appl. Phys., 1967, vol. 18, pp. 1009–1011.

RALPH S. KENDALL, Primary Examiner

U.S. Cl. X.R.

23—294; 117—106 R; 330—4.3